April 8, 1924.

A. STEINLE 1,489,372

TWIST DRILL GAUGE

Filed May 27, 1922

Inventor:
Adolf Steinle

Patented Apr. 8, 1924.

1,489,372

UNITED STATES PATENT OFFICE.

ADOLF STEINLE, OF JENA, GERMANY, ASSIGNOR TO THE FIRM OF CARL ZEISS, OF JENA, GERMANY.

TWIST-DRILL GAUGE.

Application filed May 27, 1922. Serial No. 564,254.

*To all whom it may concern:*

Be it known that I, ADOLF STEINLE, a citizen of the German Empire, and residing at Jena, Germany, have invented a new and useful Twist-Drill Gauge, of which the following is a specification.

The present invention relates to a novel gauge affording means for the examination of the position of the point of twist drills relative to the axis of the drill. By simply applying this gauge to the drill it admits of immediately recognizing whether the small edge, forming the point of the twist drill, is in the proper position, i. e. whether it intersects the axis of the twist drill and extends equally far on both sides of this axis. The gauge has two stop surfaces which lie at an angle of about 90° relative to each other and which, owing to their being rigidly connected with each other, form a right angular stop into which the drill to be examined is placed. At one end of this right-angular stop there is fixed, perpendicularly to the stop surfaces, a disc provided with three lines, viz, a middle, straight line, bisecting the angle between the two stop surfaces, and two other lines, running symmetrically to this middle line and converging on the vertex of this angle. By the two latter lines the ordinary breadth of the point for each diameter of the drill is limited in the direction perpendicular to the line bisecting the angle. In order to protect the aforesaid ruled disc from being injured by the point of the drill it is advisable to provide it on the side facing the stop with a protection plate of particularly hard, transparent material, e. g. a quartz plate. However, in that case it is imperative to always observe perpendicularly to the said plate in order to avoid a parallactic error between the line-mark and the point of the drill which may arise owing to an oblique direction of vision. This can be done in a simple manner by fixing above the ruled disc at a suitable distance a diaphragm, having an observation-aperture which fixes the direction of vision. This diaphragm admits of also being constructed as a concave mirror on the side facing the ruled disc, so that the point of the drill is illuminated by the light reflected from this mirror. A particularly suitable constructional form is attained by disposing above the ruled disc a magnifying lens so that it is possible to observe the point of the drill as well as the line-marks with the magnification furnished by this lens. It is also in this case advisable to fit behind the magnifying lens a diaphragm having an observation-aperture, whereby the side of the diaphragm, facing the magnifying lens, may again be constructed as a concave mirror.

Figure 1:
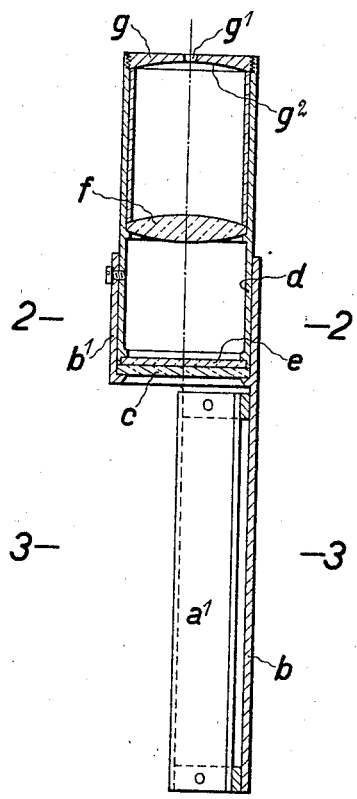
Figure 2:
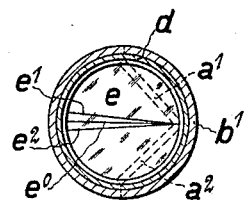
Figure 3:
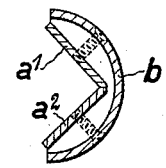

The annexed drawing shows a constructional example of the invention. Fig. 1 shows a longitudinal section of the gauge, Figs. 2 and 3 are cross sections on the lines 2—2 and 3—3, respectively of Fig. 1, Fig. 2 particularly showing the ruled disc, Fig. 3 particularly the ridge-shaped stop.

Two plates $a^1$ and $a^2$, adjoining at right angles, are rigidly connected to each other by a semicircular casing $b$, thus forming an angular hollow space into which the drill is inserted for examination. At its top end the casing $b$ turns into a box $b^1$, the bottom of which consists of a hardened glass plate $c$ and into which a sleeve $d$ is fixed. The latter carries at the bottom a ruled disc $e$, at the middle a magnifying lens $f$ and at the top an end-plate $g$, having a small observation-aperture $g^1$ disposed in the axis of the magnifying lens $f$. The ruled disc $e$ rests directly upon the hardened glass plate $c$ and is provided with three lines, viz, a middle, straight line $e^0$, bisecting the angle of the two rulers $a^1$ and $a^2$, and two lines $e^1$ and $e^2$, running symmetrically to the first line and limiting the breadth of the point for each diameter of the drill. The bottom $g^2$ of the end-plate $g$ is devised as a concave mirror so that the point of the drill is illuminated by the light entering beside the drill from below and reflected by the concave mirror $g^2$.

The operation of the above described gauge may be easily inferred from its construction. The drill to be examined must be inserted into the angular space of the plates $a^1$ and $a^2$ in such a manner that its point touches the hardened glass plate $c$, whereupon the position of the point of the drill relative to the line-marks $e^0$, $e^1$ and $e^2$ is examined through the opening $g^1$. If the point of the drill be properly ground, the small edge of the point can be brought into coincidence with the line $e^0$ of the ruled disc by a corresponding rotation of the drill and, on the drill being rotated by 90°, the two ends of the small edge are symmetrical to the line $e^0$, i. e. they coincide with the lines $e^1$ and $e^2$, or are equidistant from them on both sides.

I claim:

1. Twist drill gauge, consisting of a stop comprising two elongated flat plates with surfaces disposed relatively to each other at an angle of about 90° and a ruled disc fixed to said stop at one of its ends perpendicularly to the line of intersection of the two plates, the said ruled disc being provided with a straight line bisecting the angle between the plates, and with two other lines forming an angle bisected by the said straight line.

2. Twist drill gauge, consisting of a stop comprising two elongated flat plates with surfaces disposed relatively to each other at an angle of about 90° and a ruled disc fixed to said stop at one of its ends perpendicularly to the line of intersection of the two plates, the said ruled disc being provided with a straight line bisecting the angle between the plates and with two other lines forming an angle bisected by the said straight line, and the said ruled disc being also covered on the side facing the said stop with a plate of particularly hard, transparent material.

3. Twist drill gauge, consisting of a stop comprising two elongated flat plates with surfaces disposed relatively to each other at an angle of about 90° and a ruled disc fixed to said stop at one of its ends perpendicularly to the line of intersection of the two plates, the said ruled disc being provided with a straight line bisecting the angle between the plates, and with two other lines forming an angle bisected by the said straight line, and the said ruled disc being also covered on the side facing the said stop with a plate of particularly hard, transparent material, and provided on the other side with a diaphragm containing an observation-aperture.

4. Twist drill gauge, consisting of a stop comprising two elongated flat plates with surfaces disposed relatively to each other at an angle of about 90° and a ruled disc fixed to said stop at one of its ends perpendicularly to the line of intersection of the two plates, the said ruled disc being provided with a straight line bisecting the angle between the plates, and with two other lines forming an angle bisected by the said straight line, and the said ruled disc being also covered on the side facing the said stop with a plate of particularly hard, transparent material and provided on the other side with a diaphragm containing an observation-aperture and being constructed as a concave mirror on the side facing the said ruled disc.

5. Twist drill gauge, consisting of a stop comprising two elongated flat plates with surfaces disposed relatively to each other at an angle of about 90° and a ruled disc fixed to said stop at one of its ends perpendicularly to the line of intersection of the two plates, the said ruled disc being provided with a straight line bisecting the angle between the plates, and with two other lines forming an angle bisected by the said straight line, and the said twist drill gauge being also connected with a magnifying lens, disposed above the said ruled disc.

6. Twist drill gauge, consisting of a stop comprising two elongated flat plates with surfaces disposed relatively to each other at an angle of about 90° and a ruled disc fixed to said stop at one of its ends perpendicularly to the line of intersection of the two plates, the said ruled disc being provided with a straight line bisecting the angle between the plates, and with two other lines forming an angle bisected by the said straight line, and the said twist drill gauge being also connected with a magnifying lens, disposed above the said ruled disc and a diaphragm, disposed behind the said disc and containing an observation-aperture.

7. Twist drill gauge, consisting of a stop comprising two elongated flat plates with surfaces disposed relatively to each other at an angle of about 90° and a ruled disc fixed to said stop at one of its ends perpendicularly to the line of intersection of the two plates, the said ruled disc being provided with a straight line bisecting the angle between the plates, and with two other lines forming an angle bisected by the said straight line, and the said twist drill gauge being also connected with a magnifying lens, disposed above the said ruled disc and a diaphragm, disposed behind the said disc and containing an observation-aperture, the said diaphragm being constructed as a concave mirror on the side facing the said magnifying lens.

ADOLF STEINLE

Witnesses:
PAUL KRÜGER,
FRITZ SANDER.